US006220616B1

(12) United States Patent
Finch

(10) Patent No.: US 6,220,616 B1
(45) Date of Patent: Apr. 24, 2001

(54) WHEELCHAIR ARM REST SUPPORT ASSEMBLY WITH SLIDE LOCK POSITIONING ARM

(75) Inventor: Thomas E. Finch, Spring Branch, TX (US)

(73) Assignee: Teftec Corporation, San Antonio, TX (US)

( * ) Notice: Subject to any disclaimer, the term of this patent is extended or adjusted under 35 U.S.C. 154(b) by 0 days.

(21) Appl. No.: 09/431,314

(22) Filed: Nov. 2, 1999

(51) Int. Cl.[7] .......................... B60N 2/46
(52) U.S. Cl. .......................... 280/304.1; 297/411.32
(58) Field of Search .......................... 280/250.1, 304.1; 297/411.3, 411.32, 411.33, 411.38, 411.45; 248/286.1, 284.1

(56) References Cited

U.S. PATENT DOCUMENTS

| | | | | |
|---|---|---|---|---|
| 242,573 | * | 6/1881 | Wilson | 297/411.32 |
| 1,083,092 | * | 12/1913 | Hannah | 248/286.1 |
| 1,219,960 | * | 3/1917 | Lagerstrom | 297/411.33 |
| 3,261,641 | * | 7/1966 | Black et al. | 297/411.33 |
| 5,145,197 | * | 9/1992 | Gatti | 280/304.1 |
| 5,322,344 | * | 6/1994 | Hoffman et al. | 297/191 |

FOREIGN PATENT DOCUMENTS

| | | | | |
|---|---|---|---|---|
| 95094 | * | 3/1939 | (SE) | 297/411.32 |

* cited by examiner

*Primary Examiner*—Anne Marie Boehler
(74) *Attorney, Agent, or Firm*—Cox & Smith Incorporated

(57) ABSTRACT

An arm rest assembly for a wheelchair movable between a lowered position suitable for resting an arm thereon and a raised position suitable for gaining access to the seat of the wheelchair. The arm rest assembly comprises two generally parallel arm elements, each of which are pivotally attached to the wheelchair frame at a point adjacent to the back of the wheelchair. The lower arm element is linked to the upper arm element by way of a sliding pin positioned within a longitudinal slot in the upper arm element. One end of the longitudinal slot includes an angled segment into which the sliding pin falls when the arm rest assembly is in a lowered position. This angled segment of the slot locks the two arm elements into a parallel configuration and prevents their rotation with respect to the attachment points on the wheelchair. Lifting the lower arm element so as to raise the sliding connection pin from the angled segment of the slot into the straight segment of the slot permits rotation of the two arm elements with respect to the pivot attachment points. In this manner the arm rest assembly may be raised so as to provide access to the seat of the wheelchair.

3 Claims, 7 Drawing Sheets

WHEELCHAIR ARM REST SUPPORT ASSEMBLY WITH SLIDE LOCK POSITIONING ARM

BACKGROUND OF THE INVENTION

1. Field of the Invention

The present invention relates generally to structural components associated with wheelchairs and the like. The present invention relates more specifically to movable arm rest assemblies associated with wheelchairs and the like, especially those capable of being locked into position.

2. Description of the Related Art

The structural components of wheelchairs and the like vary significantly depending upon the manufacturer and depending upon the specific requirements the wheelchair is designed to fulfill. Among the most basic structural components associated with nearly every wheelchair, however, are seat platforms, back rests, arm rests, leg rests, and of course, wheel components. Various structural assemblies for each of the basic components are well known in the art. Most of these structures are defined by and derive from the functions associated with the components.

Arm rests in particular are structured to provide suitable support to an individual seated within the wheelchair and in particular to provide lateral or side-to-side enclosures to facilitate the safety and comfort of the individual within the chair. While side arm rests serve the primary function of safely and comfortably positioning the wheelchair occupant on the wheelchair seat, they also must be structured so as to permit easy entry to or exit from the wheelchair. In some cases, entry to or exit from the wheelchair can be accomplished from the front without regard to the position of the arm rests. In many other cases, however, structures associated with the wheelchair prevent easy access to and from the seat of the chair from the front and require some type of access from the side over or around the arm rest assemblies.

Many wheelchair designs therefore have structured arm rests that are capable of being rotated out of the way in order to allow access to the seat area of the chair. In most cases such movement of the arm rest entails rotation about an attachment point on the back of the chair in a manner that lifts the arm rest up and back to provide access. Various rotational stops are well known that serve to limit this motion of the arm rest to a defined range.

A problem, however, with most such rotating arm rests is that they fail to provide adequate rigidity or support when movement is not desired. In many instances the arm rest of the wheelchair is used to support, position, and assist in the movement of the wheelchair occupant. If the arm rest too easily rotates up and back, it fails in its function as a support component.

It is desirable, therefore, that the arm rest, if rotatable to provide access, should be capable of being locked in a downward or lowered position in order to provide sufficient rigid support to the user. There have been various attempts at providing locking mechanisms at the rotation or pivot attachment point for the arm rest on the wheelchair. Such attempts have either failed because of their complexity or because of their inability to withstand repeated use or significant rotational forces. Other attempts have failed because the various mechanisms for locking or unlocking the arm rest are complicated, cumbersome, and difficult to manipulate.

It would be desirable to have an arm rest structure that provided sufficient rigidity and strength when in a lowered position such that forces tending to lift the arm up and back would not rotate the arm rest unless a locking mechanism was released. It would be desirable if such a locking mechanism were easy to manipulate and did not require complicated release or lock setting structures.

SUMMARY OF THE INVENTION

It is therefore an object of the present invention to provide an arm rest assembly for a wheelchair, movable between a lowered position suitable for resting an arm thereon and a raised position suitable for gaining access to the seat of the wheelchair.

It is a further object of the present invention to provide a movable arm rest assembly that provides access to the seat of a wheelchair and at the same time is capable of being locked in a lowered position so as to permit the arm rest to serve the additional function of a structurally rigid support member.

It is a further object of the present invention to provide a movable arm rest assembly for a wheelchair that can be locked in a lowered position that can be readily released from the locked condition through an easily manipulable mechanism.

It is a further object of the present invention to provide an arm rest assembly for a wheelchair, movable between a lowered position and a raised position, which automatically locks in the lowered position and which may easily be released so as to be raised for access to the seat of the wheelchair.

It is a further object of the present invention to provide a movable arm rest assembly for a wheelchair, that consists of relatively few linkage components such that repeated movement of the arm rest from a lowered to a raised position and back does not cause significant deterioration of the linkage mechanism over time.

It is a further object of the present invention to provide a movable arm rest assembly for a wheelchair, that is structurally capable of supporting greater loads in a downward direction on the arm rest without greatly increasing the overall weight or size of the arm rest assembly.

In fulfillment of these and other objectives, the present invention provides an arm rest assembly for a wheelchair movable between a lowered position suitable for resting an arm thereon and a raised position suitable for gaining access to the seat of the wheelchair. The arm rest assembly comprises two generally parallel arm elements, each of which are pivotally attached to the wheelchair frame at a point adjacent to the back of the wheelchair. The lower arm element is linked to the upper arm element by way of a sliding pin positioned within a longitudinal slot in the upper arm element. One end of the longitudinal slot includes an angled segment into which the sliding pin falls when the arm rest assembly is in a lowered position. This angled segment of the slot locks the two arm elements into a parallel configuration and prevents their rotation with respect to the attachment points on the wheelchair. Lifting the lower arm element so as to raise the sliding connection pin from the angled segment of the slot into a straight segment of the slot permits rotation of the two arm elements with respect to the pivot attachment points. In this manner the arm rest assembly may be raised so as to provide access to the seat of the wheelchair.

DESCRIPTION OF THE PREFERRED EMBODIMENTS

It is preferred that the structural components of wheelchairs and the like not only be strong, rigid, and durable but also lightweight. For this reason, it is well known to incorporate structural components made of aluminum or other similar lightweight metals. The arm rest assembly of the present invention is constructed primarily of aluminum plate components typically on the order of ½" thick. Other components as are described below comprise aluminum plate on the order of ⅛" thick. The various plate components are positioned and retained one to another primarily by means of standard sized steel nuts, bolts, and washers as is well known in the art. In the preferred embodiment the aluminum plate components of the assembly are anodized to prevent corrosion, deterioration, and to provide an appropriate appearance to the assembly. Various other washers, pins, and spacers are described in association with the assembly in order to facilitate the smooth motion of the assembly between its intended positions.

Figure 1:
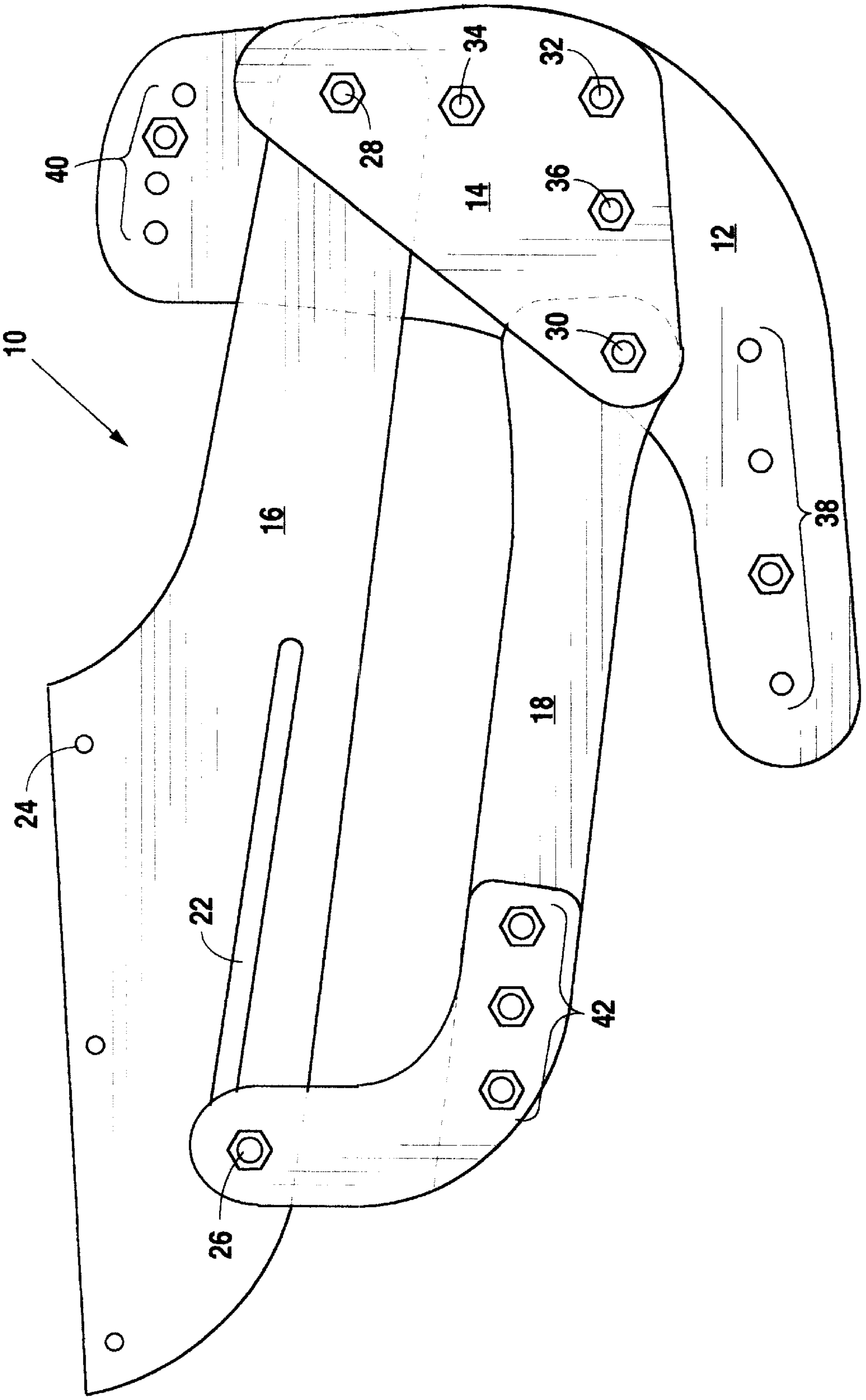
FIG. 1 is a side view of the arm rest assembly of the present invention shown in a lowered position.

Reference is made first to FIG. 1 for a description of the basic components of the assembly of the present invention and the linkages between them. FIG. 1 shows a side view of arm rest assembly (10) comprised primarily of upper arm element (16) and lower arm element (18). Arm elements (16) and (18) extend in a generally parallel fashion out from attachment points described in more detail below. Mounting plate (12) and one of two axle plates (14) are also shown.

Mounting plate (12) is intended to be the means whereby arm rest assembly (10) is attached to the wheelchair. Two arrays of mounting holes (38) and (40) are appropriately positioned to permit such attachment with a variety of wheelchair configurations. The balance of arm rest assembly (10) is attached to mounting plate (12) by means of bolts (28), (30), (32), (34), and (36). The dashed lines shown in FIG. 1 for arm elements (16) and (18) indicate that upper arm element (16) is rotatably attached at bolt (28) and lower arm element (18) is rotatably attached at bolt (30). Bolts (32), (34), and (36) provide rigid attachment of axle plate (14) to a second axle plate (not shown) and to mounting plate (12).

Lower arm element (18), which is rotatably attached by way of a bushing (not shown) at bolt (30), extends generally parallel to upper arm element (16) and, at its terminal end, is attached to yoke plates (20) by way of bolts (42). Yoke plates (20) (one of which is not seen in FIG. 1) are attached one on either side of lower arm element (18) and thereby form a yoke which extends up to encompass either side of upper arm element (16). Appropriately positioned holes in each of yoke plates (20) permit the passage of bolt (26) therethrough. When positioned as shown in FIG. 1, bolt (26) also passes through slot (22) positioned in upper arm element (16). In this manner bolt (26) acts as a sliding pin moveable within slot (22) as upper arm element (16) and lower arm element (18) rotate. A plurality of holes (24) are positioned along an upper edge of upper arm element (16) and serve as an attachment point for a cushioned arm rest pad or the like.

In FIG. 1 bolts, (28) and (30) are shown to provide pivoting rotation points for upper and lower arm elements (16) and (18). Each arm element (16) and (18) has a hole positioned at one end thereof (as described in more detail below) through which passes a bushing which in turn is held in place by bolts (28) and (30). In this manner both arm elements (16) and (18) are free to rotate around the pivot points defined by bolts (28) and (30).

Because of the linkage between upper arm element (16) and lower arm element (18) at sliding pin (bolt) (26) and the fixed relationship between pivot points (28) and (30), arm elements (16) and (18) will tend to remain parallel and will rotate in unison when either one is induced to move. In this manner, if slot (22) were simply a single longitudinal slot, the process of lifting upper arm element (16) would correspondingly lift lower arm element (18) and cause pin (26) to slide within slot (22). The assembly of the present invention, however, incorporates an angled segment to slot (22) which is described in more detail below with respect to FIG. 2. Because of this angled segment, pin (26) is held in a locked position within slot (22) such that lifting upper arm element (16) does not result in the rotation of either arm element or the movement of pin (26) along slot (22). In this manner the arm rest assembly of the present invention can be maintained in a semi-rigid locked position in the lowered configuration shown in FIG. 1.

In addition to providing the semi-rigid position locking mechanism, lower arm element (18) and sliding pin (bolt) (26) provide significant additional vertical support for a load placed on top of the arm rest assembly of the present invention. Rather than depending upon the support structures associated only with upper arm element (16), the assembly of the present invention distributes the weight placed upon the arm rest between the two components, upper arm element (16) and lower arm element (18). This provides a much greater load bearing capacity for the overall arm rest assembly.

Figure 2:
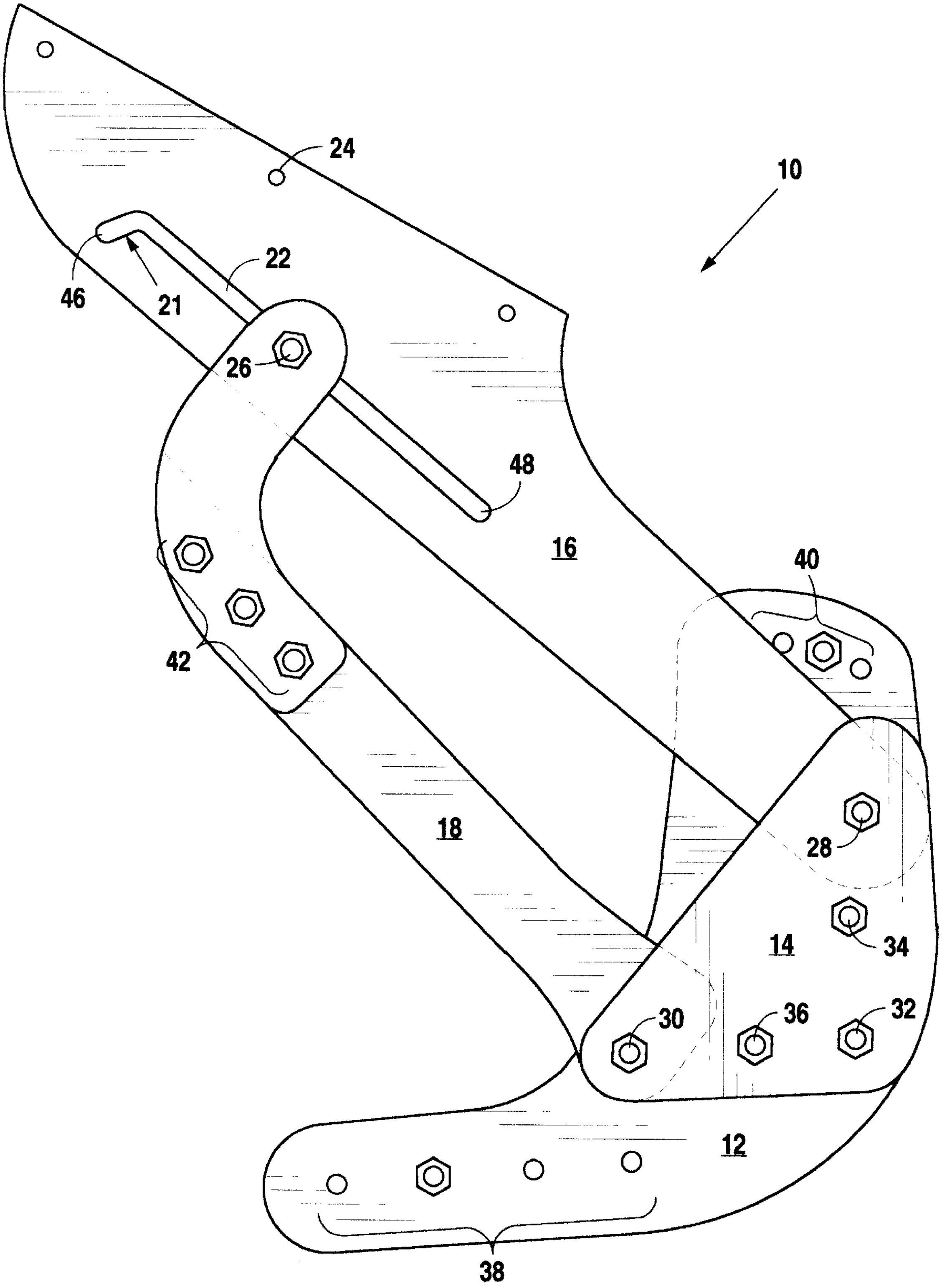
FIG. 2 is a side view of the arm rest assembly of the present invention shown in an elevated or raised position.

FIG. 2 shows the same view of the assembly of the present invention in a partially raised configuration. All of the same components are described and identified as are shown in FIG. 1. What is additionally visible in FIG. 2, as upper arm element (16) and lower arm element (18) are each rotated up from their previous positions, is the configuration of angled segment (46) of slot (22) positioned in upper arm element (16). When pin (26) is positioned in angled segment (46) of slot (22), it is not free to move down the length of slot (22) toward the opposite end (48). Instead, land surface (21) prevents the movement of pin (26) down slot (22) when upper arm element (16) is directed upward as through a lifting motion of force. Pin (26) impacts against land surface (21) and prevents such motion from occurring.

On the other hand, if lower arm element (18) is first lifted or forced upward with respect to upper arm element (16), pin (26) is removed from angled segment (46) and thereby removed from contact with land surface (21). Once lifted out of angled segment (46), pin (26) is free to slide down slot (22) and at the same time arm elements (16) and (18) are free to rotate about their respective pivot points.

In the above described manner, the combination linkage of the assembly of the present invention permits a semi-rigid locked lowered position for the arm rest and an easily manipulable release to the locking mechanism to permit rotation of the arm rest up and out of the way.

Figure 3:
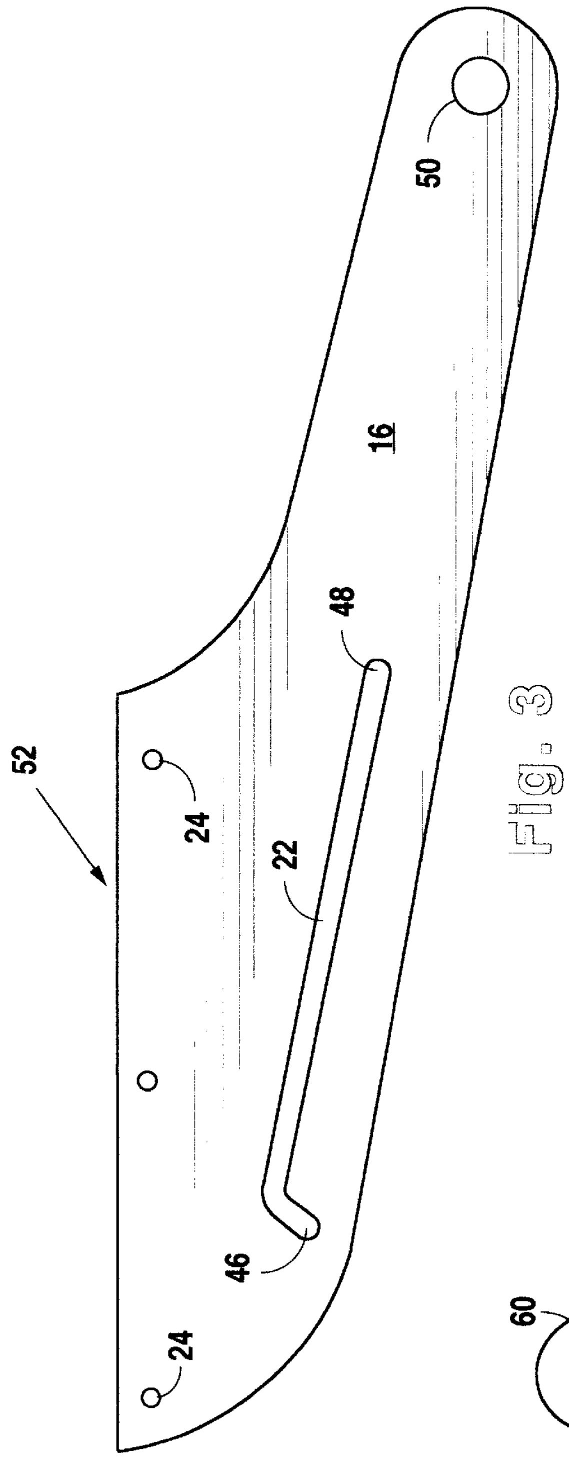
FIG. 3 is a side view of the upper arm element of the assembly of the present invention.

Reference is now made to FIGS. 3–9 for a detailed description of each of the individual components of the assembly of the present invention. FIG. 3 discloses a side view of upper arm element (16) of the assembly. As indicated above, aperture (50) is positioned at a first end of upper arm element (16) and serves as a rotation point for arm element (16) with respect to a fixed axis on the wheelchair. Likewise seen in FIG. 3, and as described above, is slot (22) having angled segment (46) and longitudinal segment (48). A plurality of holes (24) are positioned to appropriately retain an arm rest cushion or the like on upper edge (52).

Figure 4:
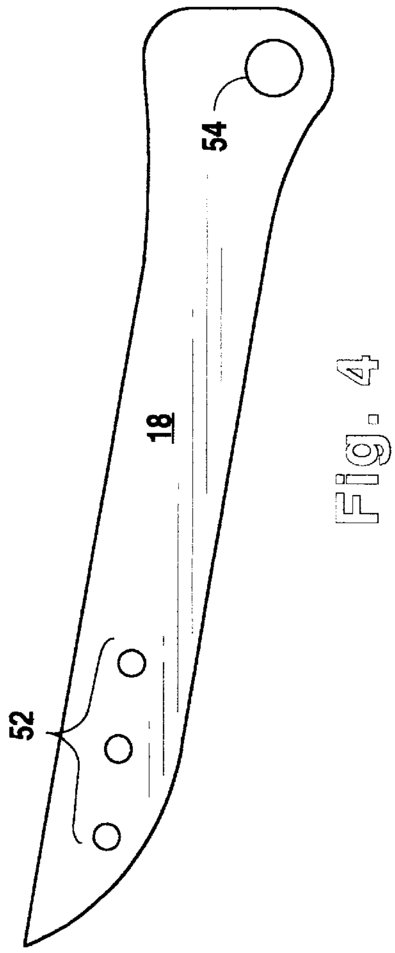
FIG. 4 is a side view of the primary component of the lower arm element of the assembly of the present invention.

FIG. 4 is a side view of lower arm element (18). Like upper arm element (16), lower arm element (18) has an aperture (54) sized and positioned to receive a bushing (see FIG. 10) and to provide the pivot point for rotation of lower arm element (18). A plurality of holes (52) are positioned at an opposite end of lower arm element (18) and serve to retain yoke plates (19) and (20) as described below.

Figure 5:
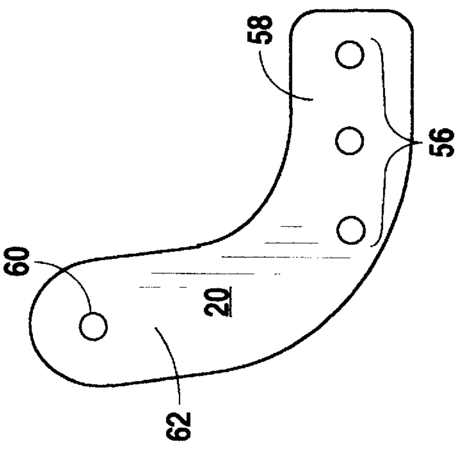
FIG. 5 is a side view of one of two yoke components associated with the lower arm element of the assembly of the present invention.

FIG. 5 shows a side view of one of two identical yoke plates (19) and (20) that are attached to and serve as the terminal end of lower arm element (18). Placed on either side of lower arm element (18), yoke plate (20) align holes (56) with holes (52) in lower arm element (18). Bolts (41) and nuts (42) (shown in FIG. 10) attach yoke plates (19) and (20) to lower arm element (18).

Yoke plates (19) and (20) are arcuate plates of a thickness generally less than the thickness of the plates from which the balance of the assembly components are constructed. In the preferred embodiment, yoke plates (19) and (20) are ⅛" thick aluminum plate configured in the arcuate sections shown in the drawings. A first end (58) of yoke plate (20) is positioned as described above and serves as the attachment point for lower arm element (18). Opposite of first end (58) is end section (62) which retains hole (60) through which bolt (26) (seen in FIG. 1) is passed. As described above, end sections (62) of each of the two yoke plates are positioned one on either side of upper arm element (16) in a manner that aligns hole (60) with some portion of slot (22). The length of lower arm element (18) with respect to the length of upper arm element (16) is such that when each is in a generally horizontal configuration, bolt pin (26), placed through holes (60) and slot (22), is positioned in angled segment (46) of slot (22) as shown in FIG. 1.

Figure 6:
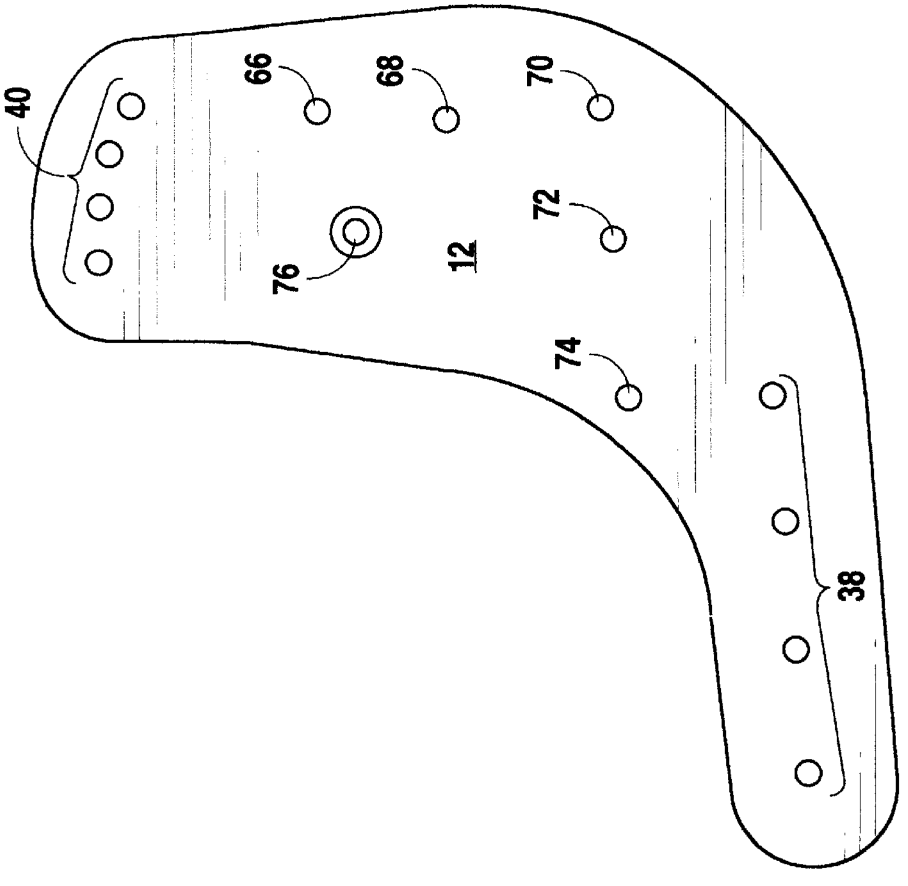
FIG. 6 is a side view of the mounting plate component of the assembly of the present invention.

FIG. 6 is a side view of mounting plate (12) showing the various attachment points for not only assembling the present invention but attaching the entire assembly to the wheelchair. Holes (66), (68), (70), (72), and (74) are positioned to appropriately receive bolts (28), (30), 34), (32), and (36) as shown in FIG. 1. Holes arrays (38) and (40) are appropriately positioned for the purpose of attaching mounting plate (12) to the remaining structural framework of the wheelchair. The plurality of holes (38) and (40) are provided in order to provide versatility to the means for attaching the assembly of the present invention to a variety of wheelchair configurations. Hole (76), which in the preferred embodiment is a countersunk hole, retains an additional bolt (not shown) for the purpose of further securing mounting plate (12) to the wheelchair.

The configuration of mounting plate (12) is such that it can be positioned generally near the point at which the seat platform of the wheelchair meets the back support. Thus, holes (38) would serve as attachment points between the assembly of the present invention and the seat platform frame of the wheelchair, and holes (40) would serve as attachment points between the assembly and the back support structure of the wheelchair.

Figure 7:
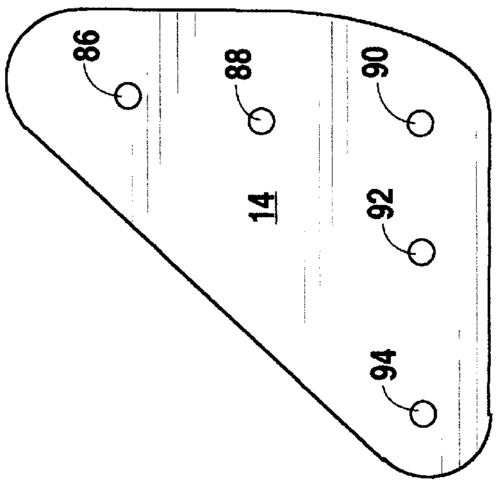
FIG. 7 is a side view of one of two axle plate components of the assembly of the present invention.

FIG. 7 is a side view of one of two axle plate components of the assembly of the present invention. These triangular aluminum plates (5⁄16" thick in the preferred embodiment) serve as the framework for positioning and holding the axle pivot points for each of the arm elements of the assembly. As shown in more detail below, bushings are positioned adjacent holes (86) and (94) in axle plate (14) and serve as rotation points for arm elements (16) and (18), respectively. Holes (88), (90), and (92) serve as rigid attachment points for establishing the framework provided by axle plates (14) and (15).

Figure 8:
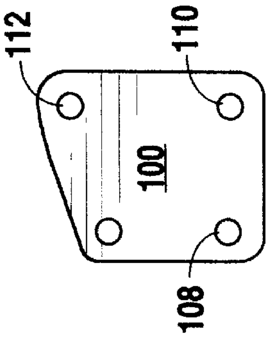
FIG. 8 is a side view of a gasket component of the assembly of the present invention.

FIG. 8 discloses metal gasket (100) which is positioned in association with holes (88), (90), and (92), matching with holes (108), (110), and (112) as part of the assembly for the framework provided by axle plates (14) and (15).

Figure 9:
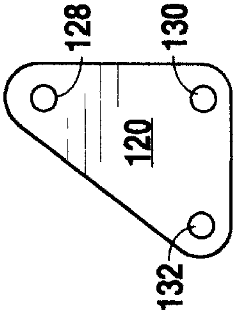
FIG. 9 is a side view of the spacer plate component of the assembly of the present invention.

FIG. 9 discloses spacer plate (120) which is positioned between the two axle plates (14) and (15) and aligns holes (128), (130), and (132) with holes (88), (90), and (92) in axle plate (14).

Figure 10:
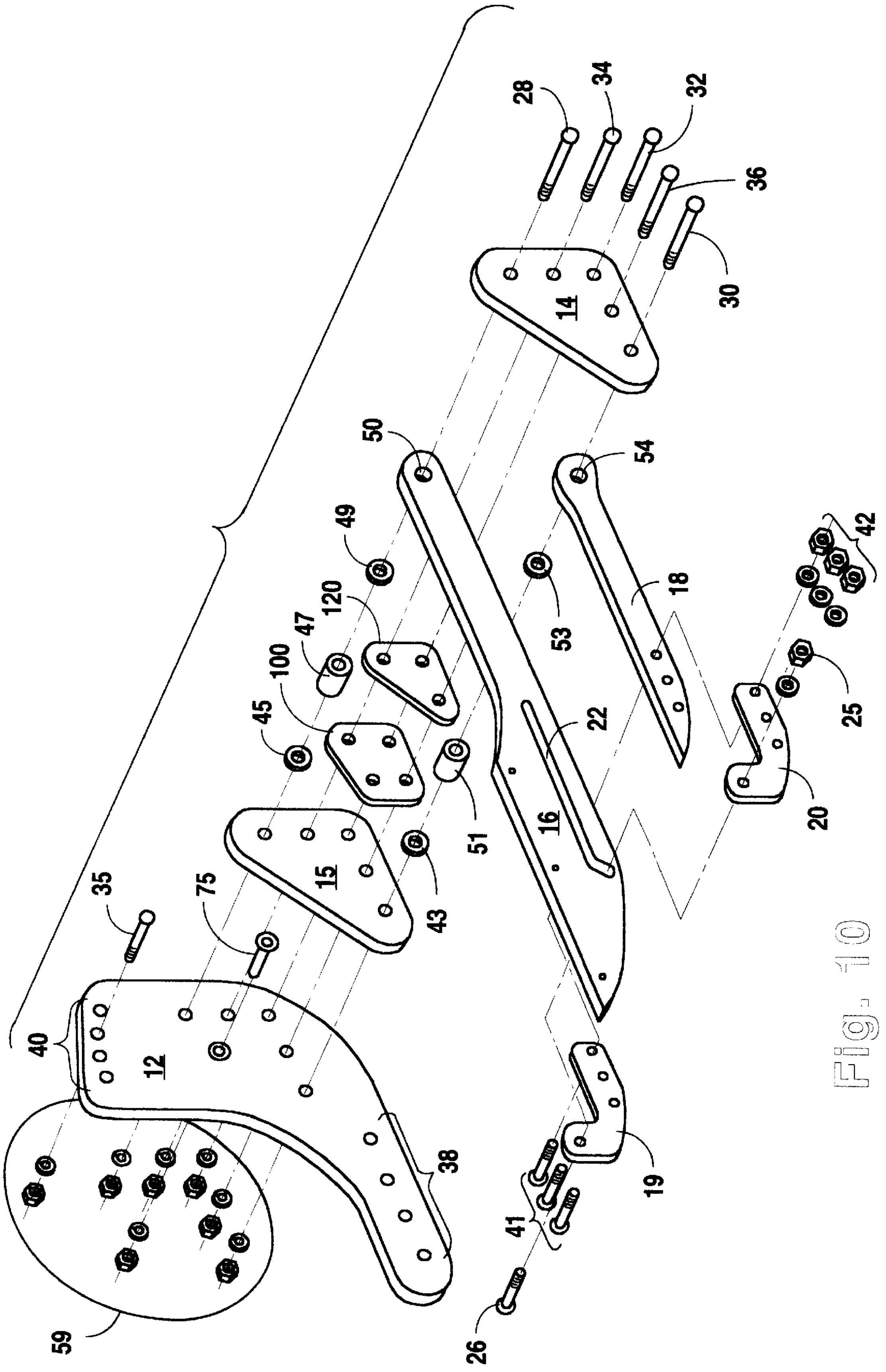
FIG. 10 is an exploded perspective view of the entire arm rest assembly of the present invention.

The entire arm rest assembly of the present invention can best be understood by reference to FIG. 10, which is an exploded perspective view showing each of the components and its linkage with the remaining components in the assembly. In FIG. 10, arm elements (16) and (18) are sandwiched between axle plates (14) and (15). Apertures (50) and (54) in arm elements (16) and (18), respectively, are sized such that bushings (47) and (51) may pass therethrough and serve as rotational surfaces for the movements described above. Teflon washers (49), (53), (43), and (45) are positioned on either side of bushings (47) and (51) to provide smooth rotational motion for arm elements (16) and (18). Spacer plate (120) is likewise sandwiched between axle plates (14) and (15) and serves to provide the appropriate spacing to permit free movement of arm elements (16) and (18) therebetween. Metal gasket (100) serves to appropriately position spacer plate (120) within the framework defined by axle plates (14) and (15).

Bolts (32), (34) and (36) pass through first axle plate (14), then through spacer plate (120), then through metal gasket (100), then through second axle plate (15), and finally through mounting plate (12) where they are secured by means of washers and nuts (59). In this manner axle plates (14) and (15) are held rigidly positioned on the wheelchair by way of mounting plate (12).

Bolts (28) and (30), on the other hand, pass first through axle plate (14) and then through the respective apertures (50)

and (54) in arm elements (16) and (18). Bolts (28) and (30) then pass through washers (49) and (53), then through bushings (47) and (51), through washers (45) and (43), through axle plate (15), and finally through mounting plate (12), where they are secured by appropriate washers and nuts (59).

The linkage between upper arm element (16) and lower arm element (18) is accomplished by means of yoke plates (19) and (20) positioned on either side of each arm element. Bolts (41) pass through appropriate holes in yoke plate (19), then through the appropriate holes in lower arm element (18), and then through holes in second yoke plate (20) where they are attached by means of washers and nuts (42). The specific linkage between arm element (16) and arm element (18) is accomplished by way of bolt/pin (26) which passes through the appropriate aperture in yoke plate (19), then passes through slot (22) in upper arm element (16), then through the appropriate hole in yoke plate (20) where it is attached by way of washer and nut (25).

Figure 11:
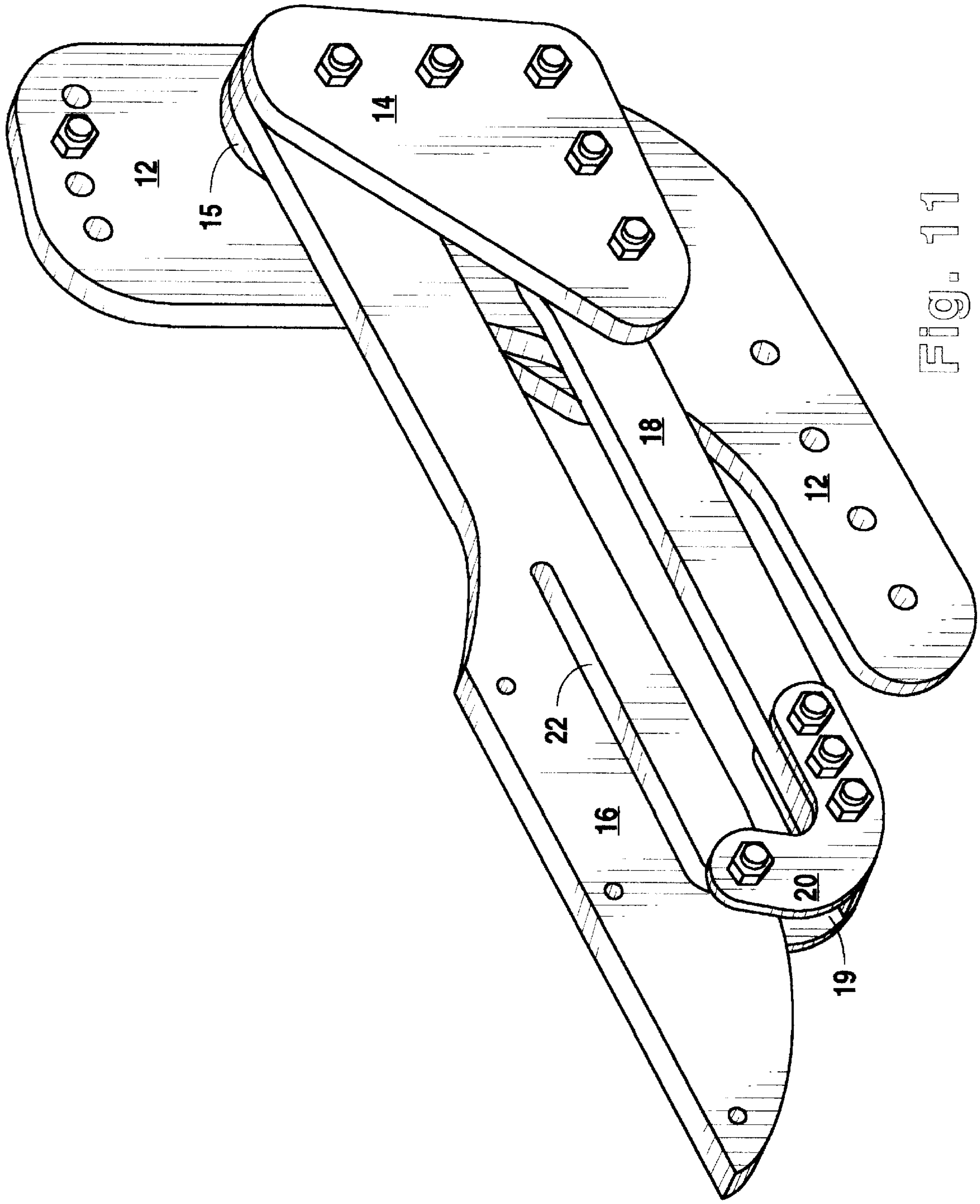
FIG. 11 is an assembled perspective view of the arm rest assembly of the present invention.

FIG. 11 is a perspective view of the complete arm rest assembly of the present invention. In this view arm elements (16) and (18) are seen as they are retained between axle plates (14) and (15), whereby they are free to rotate upward and out of the way to provide access to (or egress from) the seat platform of the wheelchair.

Figure 12:
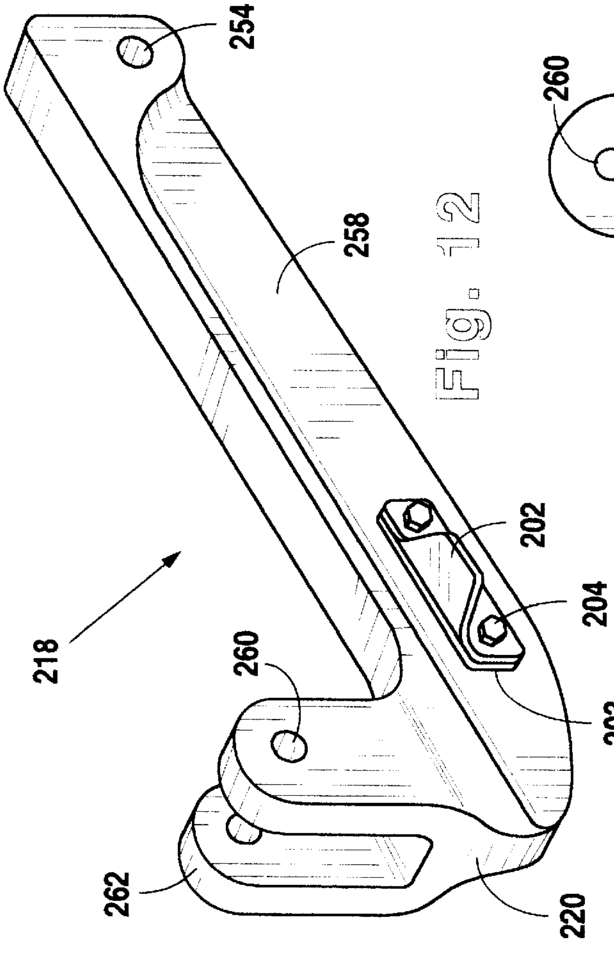
FIG. 12 is a perspective view of an alternative embodiment of the lower arm element of the assembly of the present invention.

Reference is now made to FIGS. 12–15 for a detailed description of two alternative or optional components of the arm rest assembly of the present invention. FIG. 12 is a perspective view of an alternative form of lower arm element (218). In this alternative embodiment, lower arm element (218) is cast from a single piece of metal and is machined as indicated in the drawing. Lower arm element (218) has an aperture (254) sized and positioned to receive a bushing (see FIG. 10) and to provide a pivot point for rotation of lower arm element (218). Instead of retaining the yoke plates as shown in FIG. 5, longitudinal section (258) of lower arm element (218) terminates with yoke section (220) which splits into two yoke plates (262). Each yoke plate (262) positions holes (260) to align with slot (22) in upper arm element (16) as described above.

Additionally shown in FIG. 12 is finger pull (202) which is attached to lower arm element (218) by means of bolts (204). Boss (203) is positioned behind finger pull (202) and facilitates the attachment of finger pull (202) onto longitudinal section (258) of lower arm element (218).

Figure 13:
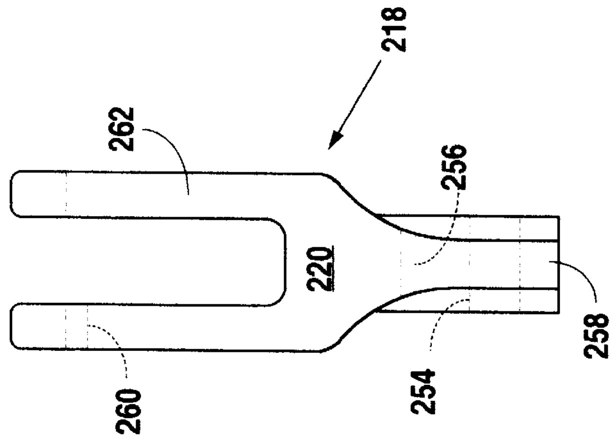
FIG. 13 is an end view of the alternative lower arm element shown in FIG. 12.

FIG. 13 is an end view of lower arm element (218) showing the slot into which upper arm element (16) is placed and the manner in which linkage between upper arm element (16) and lower arm element (218) is made. Yoke section (220) terminates in yoke plates (262), each of which retain holes (260) for placement of bolt/pin (26) which slides in slot (22) of upper arm element (16). Longitudinal section (258) of lower arm element (218) is narrower in profile than either the width of the open slot formed by yoke (220) or the width of lower arm element (218) at aperture (254). In this manner the overall weight of lower arm element (218) is slightly reduced as a result of the reduced thickness of a major portion of longitudinal section (258).

Figure 14:
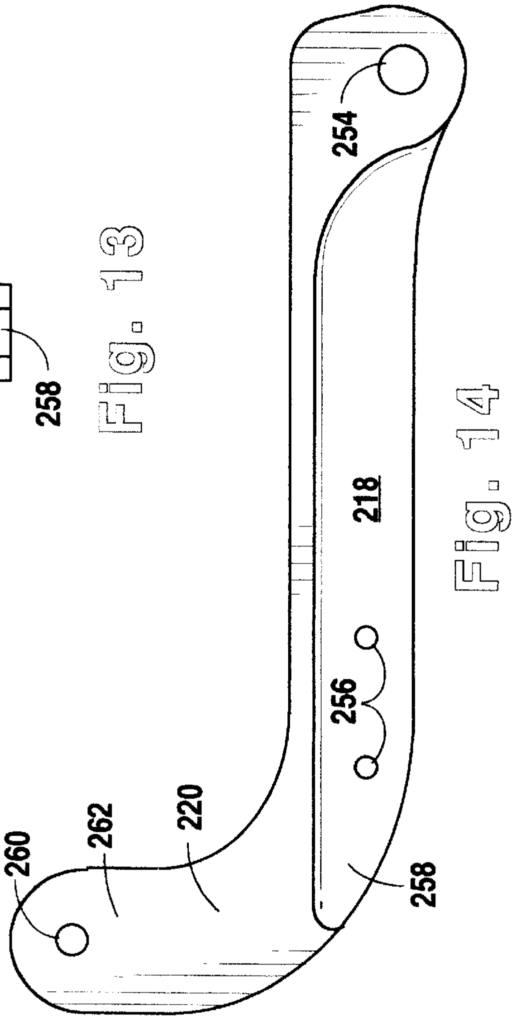
FIG. 14 is a side view of the alternative lower arm element shown in FIG. 12.

In FIG. 14 a plan view of lower arm element (218) is shown. As described above with respect to FIG. 12, a pivot point aperture (254) is provided at a first end and a pair of yoke plates (262) are provided at an opposite end. Mounting holes (256) are shown for properly positioning and placing finger pull (202).

Figure 15:
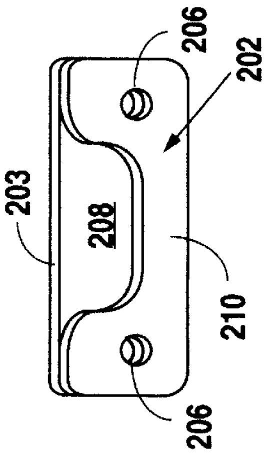
FIG. 15 is a side view of the finger pull component of the assembly of the present invention.

FIG. 15 is a plan view of finger pull component (202) appropriate for positioning on either lower arm element (218) or lower arm element (18) as described above. Finger pull (202) comprises a flat plate section (210) and a curved section (208). Holes (206) are appropriately positioned to receive bolts (204) and to attach to lower arm element (218) by means of holes (256) therein. It is understood that finger pull (202) may be appropriately positioned on lower arm element (18) in conjunction with yoke plates (20) just as easily as it may be attached to the alternative embodiment, lower arm element (218). Instead of holes (56) and (52) (see FIGS. 4 and 5), bolts (42) would pass first through holes (206) and then through holes (56) and (52) to attach finger pull (202) to the previously described embodiment of lower arm element (18). Boss (203) could likewise be utilized in conjunction with such an assembly.

The importance of finger pull (202) can be understood in conjunction with the ability of the occupant of the wheelchair to manipulate lower arm element (218) (or lower arm element (18)) in the manner required to lift the arm rest assembly of the present invention. It is not uncommon for a wheelchair occupant to encounter difficulty in turning their wrist under the lower arm element in order to lift it. Finger pull (202) provides a projection of minimal profile sufficient to catch the hand of the wheelchair occupant when lifted in an upward direction beside the arm rest assembly. In other words, finger pull (202) provides an easy mechanism whereby the lower arm element of the assembly can be lifted to release the locking mechanism of the assembly.

Although the present invention has been described in conjunction with specific components assembled to form a preferred embodiment, various modifications to the components could be made to implement the present invention in conjunction with a variety of wheelchair configurations. In addition, it is anticipated that the linkage structure of the present invention has application in other chair configurations apart from wheelchair environments. Anywhere an arm rest is required to be moveable between a raised and a lowered position, thereby providing access to the chair seating area, the linkage components of the present invention have applicability. Likewise, the present invention has been described as being constructed from components of a preferred composition and of preferred dimensions. It is anticipated that alternative types of metallic plates and the like would be appropriate for use in conjunction with the basic concepts of the invention.

Those skilled in the art will anticipate other modifications and adaptations of the present invention that fall within its intended scope as defined by the claims that follow.

I claim:

1. An arm rest assembly for a wheelchair, movable between a lowered position suitable for resting an arm thereon and a raised position suitable for gaining access to a seat of said wheelchair, said arm rest assembly comprising:

an upper arm element having a first end pivotally attached to a first fixed axle and a second end extending away from said first end, said upper arm element further defining a longitudinal slot extending along a length of said upper arm element between said first and second ends, said slot having a long straight segment and a short angled segment;

a lower arm element having a first end pivotally attached to a second fixed axle and a second end extending away from said first end, said lower arm element having a longitudinal portion extending from said first end generally parallel to said upper arm element and a transverse portion extending from said longitudinal portion to said second end, said transverse portion serving to position said second end of said lower arm element adjacent said slot in said upper arm element;

a sliding connection pin movably linking said lower arm element to said upper arm element, said connection pin held captive in a position on said lower arm element at said second end thereof and slidably positioned in said slot in said upper arm element;

first and second axle plates, said first and second fixed axles extending between said axle plates, said axle plates partially encompassing said first ends of said upper arm element and said lower arm element;

wherein in said lowered position of said arm rest assembly, said connection pin is positioned in said angled segment of said slot, said angled segment preventing a rotation of said upper arm element about said first fixed axle, and wherein in an intermediate position of said arm rest assembly, said connection pin is moved from said angled segment of said slot to said straight segment of said slot, said straight segment of said slot permitting a rotation of said upper arm element about said first fixed axle and a rotation of said lower arm element about said second fixed axle, to said raised position of said arm rest assembly.

2. The assembly of claim 1 wherein said second end of said lower arm element comprises a yoke, said yoke receiving said upper arm element and said connection pin extending across said yoke and through said slot in said upper arm element.

3. The assembly of claim 1 wherein said axle plates are positioned in spaced parallel relation by a spacer plate, said spacer plate separating said axle plates sufficiently to permit free rotation of said upper and lower arm elements between said axle plates and about said first and second fixed axles respectively.

* * * * *